(12) United States Patent
Fabian

(10) Patent No.: US 6,376,001 B1
(45) Date of Patent: Apr. 23, 2002

(54) PROCESS FOR REMOVING MICOTOXINS FROM A LOAD OF GREEN COFFEE

(75) Inventor: Missimiliano Fabian, Trieste (IT)

(73) Assignee: Demus S.p.A., Trieste (IT)

( * ) Notice: Subject to any disclaimer, the term of this patent is extended or adjusted under 35 U.S.C. 154(b) by 0 days.

(21) Appl. No.: 09/530,782

(22) PCT Filed: Oct. 24, 1998

(86) PCT No.: PCT/EP98/06760

§ 371 Date: May 5, 2000

§ 102(e) Date: May 5, 2000

(87) PCT Pub. No.: WO99/23890

PCT Pub. Date: May 20, 1999

(30) Foreign Application Priority Data

Nov. 7, 1997 (IT) .......................................... MI97A2496

(51) Int. Cl.$^7$ .................................................. A23F 5/02
(52) U.S. Cl. ...................... 426/430; 426/425; 426/432; 426/434
(58) Field of Search ................................ 426/425, 430, 426/432, 434

(56) References Cited

U.S. PATENT DOCUMENTS 5,112,637 A    5/1992   Hron, Sr. et al.
5,288,511 A    2/1994   Kazlas et al.
6,048,559 A  * 4/2000   Fabian

FOREIGN PATENT DOCUMENTS

| CH | 568719 | 11/1975 |
| DE | 2639066 A1 | 3/1978 |
| EP | 0158381 A1 | 10/1985 |
| FR | 688638 | 8/1930 |
| WO | WO9742831 | 11/1997 |

OTHER PUBLICATIONS

Hisaya Terada et al., "Liquid Chromatographic Determination of Ochratoxin A in Coffee Beans and Coffee Products," Journal of the Association Analytical Chemists, vol. 69, No. 6, 1986, pp. 960–964.

* cited by examiner

Primary Examiner—Anthony J. Weier
(74) Attorney, Agent, or Firm—Young & Thompson

(57) ABSTRACT

Green coffee is introduced into a container where it is subjected to continuous mixing in temperature continuous mixing in temperature ranging between environment and values close to 120° C. and water vapor is introduced into said container until the single beans of coffee have become porous and permeable; micotoxins are removed by extraction with a solvent in an acid environment obtained with a given acid or with a buffer solution with a given acid pH.

12 Claims, No Drawings

PROCESS FOR REMOVING MICOTOXINS FROM A LOAD OF GREEN COFFEE

The present invention concerns a process for removing micotoxins from a load of green coffee, intending as micotoxins in this case at least those micotoxins known as ochratoxins and aphlatoxins that may be present in green coffee. One of the purposes of this process is to remove the micotoxins though maintaining the quantity of caffeine within the values of a non decaffeinated coffee. It is well known that the quantities of these micotoxins in coffee are very small in an absolute sense (for instance only a few— ppb—parts per billion, that is mg/ton) and that their presence may depend on the geographic area in which coffee grows, on possible unfavourable weather conditions and on possible negligence in storage and handling.

The applicant filed patent application PCT/EP97/02014 for an industrial process suitable to removing the above mentioned micotoxins from green coffee, said process essentially comprising the following stages:
  a) introducing a load of green coffee containing micotoxins into a container in which the coffee will preferably be subjected to continuous mixing at temperatures ranging from room temperature to about 105° C.;
  b) introducing water vapour into the container where it is kept until the coffee beans have become porous and permeable;
  c) introducing into the container a solvent suited to removing waxes and micotoxins and extraction of the solvent as soon as it has removed the waxes and most of the micotoxins from the coffee;
  d) recovering the solvent and separation from the latter of the micotoxins contained therein.

A first alternative to the above said stage c) is stage:
  c') introducing into the container a solvent saturated with caffeine leaving long enough to remove the totality of the micotoxins.

In a second alternative, the process contemplates the repetition of the stage c) in order to increase the level of removal of the micotoxins.

A first drawback of the above said process lies in the difficulty, from a plant viewpoint, of operating with a solvent saturated with caffeine.

A second drawback is given by the fact that to saturate the solvent with caffeine large quantities of the latter are required.

A further drawback of said process is given by the fact that the repetition of stage c) in order to increase to a higher level the removal of the micotoxins causes the removal of further quantities of caffeine from the coffee.

The applicant has furthered experiments until finding out that, by creating an acid environment obtained by means of a chosen acid or buffer solution with a given acid pH, in some of the process stages the removal of micotoxins is increased, while at the same time, the removal of caffeine is reduced compared to the known process. Note that the Known process takes place in a neutral environment.

The suitable acid environment for the above results is to be chosen by the operator between pH=7 and pH=2 as a function of the contact time between coffee and the acid mixed with the solvent used or else the contact time between the coffee and the buffer solution as a function of the temperature at which said contact takes place.

Such an acid environment can be achieved as follows:
  introducing into the process an acid mixed with the solvent for the removal of micotoxins or, as an alternative;
  introducing into the process a buffer solution with an acid pH and leaving it in contact with the coffee for the required time;
  later discharging said buffer solution and introducing the solvent for the removal of the micotoxins.

On the basis of the results of the further experiments the process that is the subject of the present patent application comprises the following known stages:
  a) introducing a load of green coffee containing micotoxins into a container in which the coffee is preferably subjected to continuous mixing in temperature conditions ranging from room temperature to about 105° C.;
  b) introducing into the container water vapour to be kept there for the time required for the coffee beans to become porous and permeable;
and newly includes the following subsequent stages:
  c) introducing into the container a quantity of solvent equal to at least 50% of the weight of the coffee, the solvent containing a suitable quantity of acid, and leaving it in contact with the coffee for at least 10 minutes at a temperature that ranges from room temperature to about 105° C., such higher value being raised up to 120° C. when using kinds of solvent adapted to it.

This stage c) may be repeated until most of the micotoxins have been removed. Note that "suitable quantity of acid" means that amount as chosen by the operator depending on the contact time between the coffee and the acid mixed with the solvent and on the temperature at which the removal takes place;
  d) recovering the micotoxin removal material and separating the micotoxins contained therein.

An alternative to the above stage (c) is a stage:
  c') introducing a buffer solution featuring a chosen acid pH, the acidity being a function of the contact time of the same buffer solution with the coffee and as a function of the temperature at which this stage of the process takes place, the buffer solution being a variable quantity between 50 and 200% of the weight of the coffee load; the said contact time ranging between 10 and 60 minutes;
  d') discharging the buffer solution:
  e) introducing into the container a quantity of solvent, equal to at least 50% of the weight of the coffee load, and then extracting it after the removal of the greater part of the micotoxins from the coffee;
  f) recovering the micotoxin removal solvent and separating the micotoxins contained therein.

A further improvement defined by the experiments is that of adding to the water vapour in the stage (b) a quantity of water ranging between 5 and 50% of the weight of the coffee load at a temperature ranging from room temperature to 90° C. so that the coffee beans become porous and permeable more rapidly.

In order to better understand the invention some examples of embodiment of the process are described herebelow.

EXAMPLE 1

Description of a process in which the removal stage takes place at room temperature and the acid is previously mixed with the solvent:
  a) as defined above;
  b) as defined above;
  c) introducing into the container a quantity of dichloro methane equal to at least 50% of the weight of the coffee load, the dichloro methane containing 2% of formic acid, and leaving it in contact with the coffee for 30 minutes this stage being repeatable until most of the micotoxins have been removed;

d) Recovering the micotoxin removal material and separating the micotoxins contained therein.

EXAMPLE 2

Description of a process in which a container brought to room temperature is previously filled with an acid pH buffer solution:

a) as defined above;
b) as defined above;
c) introducing into the container a quantity of phosphate buffer solution with pH4, ranging from 50% to 200% of the weight of the coffee load, and leaving it in contact with the coffee for 15 minutes;
d) Discharging the buffer solution;
e) Introducing into the container dichloro methane, in a quantity equal to at least 50% of the weight of the coffee load, in order to remove the micotoxins and extracting the solvent after the removal of most of the micotoxins from the coffee;
f) Recovering the solvent and separating the micotoxins contained therein.

What is claimed is:

1. A process for removing micotoxins from a load of green coffee without substantially reducing the caffeine content of the coffee, comprising maintaining the load of green coffee with water vapor in a container until the coffee has become porous and permeable, thereafter exposing the coffee to an acid environment external to the coffee, exposing the coffee to a solvent that dissolves micotoxins from the coffee, and thereafter separating the coffee and the micotoxin-containing solvent.

2. A process as claimed in claim 1, wherein said exposure to acid environment is effected by admixing acid with said solvent.

3. A process as claimed in claim 1, wherein exposure to said acid environment is effected prior to exposing the coffee to the solvent.

4. A process as claimed in claim 1, wherein said exposure of the coffee to the solvent is carried out at a temperature from room temperature to 120° C.

5. A process as claimed in claim 1, in which said acid environment has a pH between 2 and 7.

6. A process as claimed in claim 1, wherein said solvent is dichloromethane.

7. A process as claimed in claim 1, wherein the solvent is in a quantity equal to at least 50% of the weight of the coffee and the coffee is left in contact with the acid environment for a contact time of at least 10 minutes.

8. A process as claimed in claim 1, wherein said acid environment is achieved by introducing into the container the solvent admixed with 2% formic acid.

9. A process as claimed in claim 1, and repeating the contacting of the coffee with solvent until most of the micotoxins have been removed from the coffee.

10. A process as claimed in claim 1, wherein the exposure of the coffee to acid is achieved by contacting the coffee with the buffer solution in a quantity ranging from 50 to 200% of the weight of the coffee, said buffer solution having an acid pH, for a time from 10 to 60 minutes, and then separating the coffee from the buffer solution prior to containing the coffee with the solvent.

11. A process as claimed in claim 9, wherein the buffer solution is a phosphate buffer solution of about pH 4.

12. A process as claimed in claim 1, wherein, in addition to said water vapor, a quantity of liquid water from 5 to 50% of the weight of the coffee is introduced into the container, at a temperature from room temperature to 90° C.

* * * * *